UNITED STATES PATENT OFFICE.

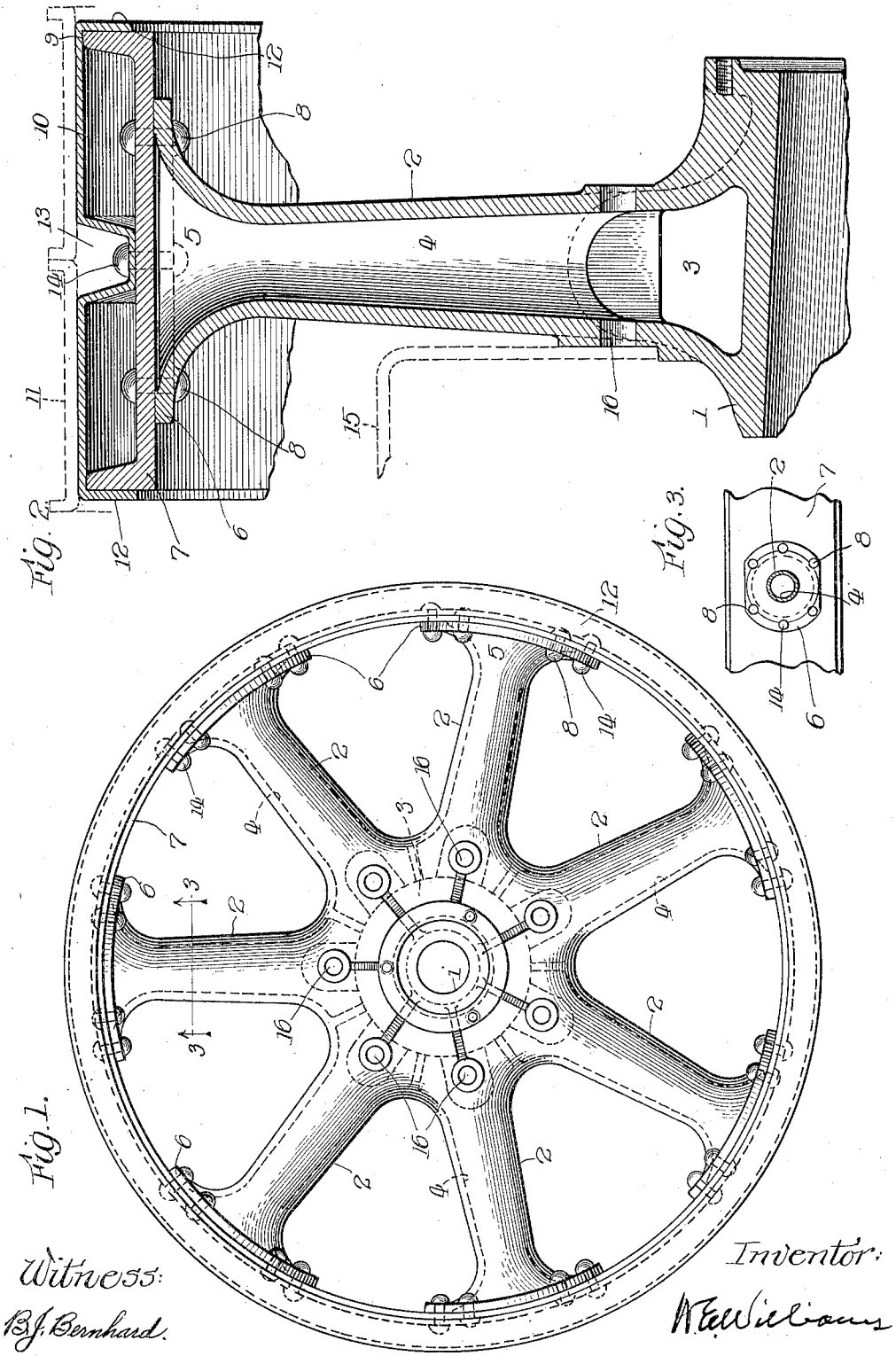

WILLIAM ERASTUS WILLIAMS, OF CHICAGO, ILLINOIS.

AUTOMOBILE SPOKED WHEEL.

1,361,655. Specification of Letters Patent. Patented Dec. 7, 1920.

Application filed December 15, 1919. Serial No. 344,863.

*To all whom it may concern:*

Be it known that I, WILLIAM ERASTUS WILLIAMS, a citizen of the United States, a resident of Chicago, in the county of Cook and State of Illinois, have invented a new and useful Improvement in Automobile Spoked Wheels, of which the following is a specification.

My invention relates to wheels that are used principally for automobile trucks and has for its object the production of a very strong, cheap wheel and one that may be made with the least foundry losses and yet to some extent simulate the tread portion of a wooden wheel.

The invention is set forth in the claims.

Reference will be had to the accompanying drawings, in which Figure 1 is a front elevation of my wheel.

Fig. 2 is a section in the plane of the axes of the hub and one of the spokes.

Fig. 3 is a section on line 3—3 of Fig. 1.

In the drawing 1 indicates the hub of a rear wheel of an automobile and this hub is cast integral with a spider having spokes 2.

The hub has an annular cavity 3 communicating with cavities 4 in the several spokes, which terminate, outwardly, in bell shaped ends 5 having marginal flanges 6 secured to a rim 7 of channel section. The rim is made from a primarily straight channel bar, which is bent to form, welded, sized, and fixed to the ends of the spokes, by rivets 8 or otherwise.

This channel section is positioned on the rim with its flanges 9 extending outward in the tread region and I box in this tread region with a cover plate 10, which furnishes the normal outside tread area of the wheel.

Steel bases 11, to carry common solid tires, are forced over the cover plate 10, and are shown in dotted lines in Fig. 2. The plate 10 is provided with annular flanges 12 which fit against the lateral faces of the channel member 7, and further is bent inward along its medial line to form a channel 13 in which are rivets 14 securing the plate to the member 7 at the end of each spoke.

By the above arrangement I am enabled to buy a regular channel section for the treads of the wheels, and by reason of the cover plate or ring 10 produce the tread of the wheel in substantially the same form as the wooden type of wheel, with its felly and felly band.

The brake drum 15 is shown in dotted lines and is secured to the wheel by bolts passing through the bolt holes 16 in the ordinary way.

Casting a spider is far simpler than casting an entire wheel and the foundry losses are much smaller; and since stock material can be used in making a rim of this type, the cost is materially less than the expense of finishing a cast rim.

What I claim is:—

1. In a wheel of the class described, a cast spider having flanged spoke ends, with a channel rim having its web secured to the ends of the spokes and its flanges extending outward, and the flanges boxed in with a cover plate ring.

2. In a wheel of the class described, a cast spider having flanged spoke ends, with a channel section rim with its flanges projecting outward and provided with a cover plate over the flanges and said cover plate having side flanges turned over the outside edges of the channel ring.

3. In a wheel of the class described, a channel section rim provided with a cover plate ring having flanges turned over on the outside flanges of the rim and having an internal depression supporting the cover plate in the middle zone thereof.

4. In a wheel of the class described, a cast spider having a rolled rim section made in two pieces forming a boxed in girder rim section and said pieces secured to each other and to the spoke ends of the spider.

5. In a wheel of the class described, a cast spider having a rim section, and said rim made in two pieces formed together making a box section and with rubber tires secured thereto and said tires having steel base rings pressed on to the rim of the wheel in a manner to aid in joining the parts together in the form of a felly band.

6. In a wheel of the class described, a channel shaped section rolled rim boxed in by a tread ring section and the latter having a central open depression, and with fastening means extending through this central opening and fastening the parts together.

Signed at Chicago, in the county of Cook and State of Illinois, this thirteenth day of December, 1919.

WILLIAM ERASTUS WILLIAMS.

Witnesses:
J. B. JEFFERSON,
B. J. BERNHARD.